(12) United States Patent
Shoemake et al.

(10) Patent No.: US 7,400,903 B2
(45) Date of Patent: Jul. 15, 2008

(54) WIRELESS COMMUNICATIONS SYSTEM USING BOTH LICENSED AND UNLICENSED FREQUENCY BANDS

(75) Inventors: Matthew B. Shoemake, Allen, TX (US); Carl M. Panasik, Garland, TX (US); Jie Liang, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 994 days.

(21) Appl. No.: 10/413,648

(22) Filed: Apr. 15, 2003

(65) Prior Publication Data

US 2004/0203815 A1    Oct. 14, 2004

Related U.S. Application Data

(60) Provisional application No. 60/372,838, filed on Apr. 16, 2002.

(51) Int. Cl.
*H04M 1/00* (2006.01)
(52) U.S. Cl. .............. 455/552.1; 455/450; 455/452
(58) Field of Classification Search ............. 455/452.1, 455/452.2, 453
See application file for complete search history.

(56) References Cited

U.S. PATENT DOCUMENTS

| | | | |
|---|---|---|---|
| 6,516,192 B1* | 2/2003 | Spaur et al. ............ | 455/450 |
| 6,801,519 B1* | 10/2004 | Mangal ................. | 370/349 |
| 6,947,469 B2* | 9/2005 | Anderson et al. ....... | 375/141 |
| 2002/0093948 A1* | 7/2002 | Dertz et al. ........... | 370/355 |
| 2002/0197984 A1* | 12/2002 | Monin et al. .......... | 455/419 |
| 2003/0163546 A1* | 8/2003 | Cheng et al. .......... | 709/217 |
| 2003/0176186 A1* | 9/2003 | Mohammed ........... | 455/432.1 |
| 2004/0185865 A1* | 9/2004 | Maanoja ............... | 455/452.2 |
| 2006/0234766 A1* | 10/2006 | Gillin et al. .......... | 455/553.1 |

* cited by examiner

*Primary Examiner*—Creighton Smith
(74) *Attorney, Agent, or Firm*—Steven A. Shaw; W. James Brady; Frederick J. Telecky, Jr.

(57) ABSTRACT

A communications system including devices (10, 20) for transmitting and receiving wireless communications over licensed and unlicensed bands is disclosed. On the transmit side, a device (10) includes a plurality of message sources (8A, 8B, 8C) and a smart router (12) function executed by a processor (30) within the device. The smart router (12) function allocates each wireless transmission, or components of a multicomponent wireless transmission, over a licensed wireless link (LLTX) or an unlicensed wireless link (ULTX), by optimizing various factors. The allocation factors include the availability of the unlicensed and licensed channels within range of the transmitting device (10); quality of service parameters such as time delay limits, jitter limits, bandwidth requirements, and the like; cost tolerance and cost per minute factors; power consumption expectations; and a combination of these and other factors. Transmission of the wireless message over the selected wireless links is then carried out. A receiving device (20) may include a smart receiver (22) that resequences the components of a multicomponent transmission for forwarding to output functions (24A, 24B, 24C) of the receiving device (20).

31 Claims, 6 Drawing Sheets

WIRELESS COMMUNICATIONS SYSTEM USING BOTH LICENSED AND UNLICENSED FREQUENCY BANDS

CROSS-REFERENCE TO RELATED APPLICATIONS

This application claims priority, under 35 U.S.C. §119(e), of Provisional Application No. 60/372,838, filed Apr. 16, 2002.

STATEMENT REGARDING FEDERALLY SPONSORED RESEARCH OR DEVELOPMENT

Not applicable.

BACKGROUND OF THE INVENTION

This invention is in the field of wireless communications, and is more specifically directed to adaptive bidirectional communications over multiple frequency bands.

Wireless communications, of many types, have gained increasing popularity in recent years. The mobile wireless (or "cellular") telephone has become ubiquitous around the world, including in those locations in which landline telephone facilities are not available. Mobile telephony has recently begun to communicate video and digital data, in addition to voice, especially as the so-called 2.5G and 3G services are deployed. Wireless modems, for communicating computer data over a wide area network, using mobile wireless telephone channels and techniques, have also been available for some time. Wireless data communications in the computer network context have also become popular. Wireless local area network (LAN) technology, such as that operating according to the well-known IEEE 802.11 standard, has become especially popular in a wide range of installations, ranging from home networks to commercial connectivity such as in airports, coffee shops, and hotels. Short-range wireless data communication according to the "Bluetooth" technology is now becoming popular, permitting computer peripherals to communicate with a personal computer or workstation within the same room.

Mobile wireless telephony is generally carried out over so-called "licensed" frequencies. These licensed frequencies refer to frequency bands in the overall spectrum that are regulated by a government entity, for example the Federal Communications Commission in the United States. Examples of licensed frequency bands include those around 800 MHz for conventional mobile cellular telephony, and those around 1.9 GHz for mobile personal communication services (PCS). Typically, mobile telephone communications are carried out over paired (uplink and downlink) frequencies within the licensed band. The licensing of frequencies permits those parties that have paid for the license rights to have exclusive use of a particular licensed frequency band within a geographical region. This licensing minimizes the likelihood of interfering communications, permitting the exclusive licensee to control traffic in that vicinity and to have recourse against unauthorized transmitters in those bands. These license rights enable the license holders, such as wireless telephone service providers, to invest in mobile wireless communication infrastructure, such as base stations, switching facilities, and the like.

Because of the license fees associated with licensed transmission and the investment in infrastructure, the licensed entities in turn generally charge their customers for use of their infrastructure and services. Typically, these charges are based on usage time, regardless of the data or signal volume used in the communications. Accordingly, licensed entities such as wireless telephone service providers have an interest in increasing the capacity of their licensed frequencies, especially considering that most licensed bands are quite narrow, thus limiting the data volume that can be carried. If the capacity of a licensed band can be increased, the revenue available to the licensed entity for a given infrastructure investment will also increase.

Unlicensed bands are also available in the radio spectrum. As evident from the term "unlicensed", radio transmission of signals in the unlicensed bands involves no license fees, so long as the transmitter complies with certain regulations regarding the use of these allocated unlicensed frequencies. An example of an unlicensed band is the so-called instrumentation, scientific, and medical (ISM) band around 2.4 MHz; other unlicensed bands also exist, including a band at around 900 MHz within the otherwise licensed PCS band, and a band at around 5.2 GHz. As a result, many types of devices now available transmit radio signals in the unlicensed bands, including landline telephones with wireless handsets, wireless local area network (LAN) adapters and access points, Bluetooth computer peripherals, and the like. Current allocations of the unlicensed bands permit a large amount of bandwidth with no license fee, resulting in the deployment of many systems that provide high data rates (on the order of Mbps) and large spectral bandwidths (on the order of MHz). However, a great deal of interference from other unlicensed band users must often be tolerated in these bands.

In recent years, not only has the coverage area of wireless telephony greatly improved, but also wireless LAN access has become widely deployed. It is believed that both of these trends of improving coverage and access will continue. In addition, many indoor locations such as office buildings and conference facilities have implemented both wireless LAN functionality and improved licensed wireless telephone coverage. As a result, many locations are now within range of both wireless LAN access and licensed wireless telephony.

Another trend in the industry is the implementation of additional media sources and applications into mobile handheld electronic devices. For example, personal digital assistants (PDAs) models now include wireless Internet access, including such functions as web browsing, sending and receiving emails, and the like, generally via wireless communication over licensed bands. New generations of mobile wireless telephones (e.g., the so-called "2.5G" and "3G" mobile wireless telephone standards) are also attaining additional functionality, including still and motion video capability, web browsing, and email functionality. So-called "Blackberry" mobile wireless email devices are now also commonplace. Indeed, the line between PDA and mobile telephone devices is becoming somewhat blurred.

By way of further background, dual-mode mobile wireless telephone handsets are known in the art. One type of dual-mode telephone handset provides the capability of either digital or analog transmission, depending upon the availability of digital wireless telephone coverage; in these telephones, the handset transmits and receives digitally when in digital coverage, and switches to analog communication only when digital coverage is not available (considering the higher power dissipation and poorer performance of analog transmission). Another type of dual-mode mobile telephone handset is capable of transmitting using a selected one of multiple modulation techniques, such as GSM, CDMA, or TDMA. The selection may be made upon activation of the mobile handset in connection with a particular service.

BRIEF SUMMARY OF THE INVENTION

It is therefore an object of this invention to provide a wireless device that is capable of utilizing both licensed and unlicensed frequency bands for the transmission of communications signals.

It is a further object of this invention to provide such a device which selects among licensed and unlicensed bands for transmission based upon an optimization criteria.

It is a further object of this invention to provide such a device which transmits separate portions of a multimedia transmission over licensed and unlicensed bands.

It is a further object of this invention to provide such a device which selects among licensed and unlicensed bands for transmission based upon a cost optimization.

It is a further object of this invention to provide such a device which selects among licensed and unlicensed bands for transmission based upon a quality of service (QoS) optimization.

It is a further object of this invention to provide such a device which selects among licensed and unlicensed bands for transmission based upon an optimization of power dissipation.

It is a further object of this invention to provide such a device which re-evaluates its selection among licensed and unlicensed bands over time, changes in location, or changes in channel characteristics.

Other objects and advantages of this invention will be apparent to those of ordinary skill in the art having reference to the following specification together with its drawings.

The present invention may be implemented by way of a wireless communications device that is capable of transmitting information from a plurality of sources, and that has radio frequency (RF) circuitry for transmitting over multiple frequencies, including those associated with licensed and unlicensed frequency bands. A routing function is implemented within the wireless device that determines which of the frequency bands are available and, based upon one or more criteria such as cost, bandwidth, quality of service (QoS), and power dissipation, that determines the bands over which part or all of a message are to be transmitted.

DETAILED DESCRIPTION OF THE INVENTION

The present invention will be described in connection with its preferred embodiments, and specifically in connection with an example of this preferred embodiment of the invention involving a multimedia or multi-function personal digital assistant (PDA). This particular example is selected because it is contemplated that this invention is especially beneficial when implemented in such a device. However, considering the wide range of modern wireless communications devices such as wireless telephones, PDAs, palmtop and tablet computers, wireless email devices, and the like, and especially considering the blurring among these devices, it is contemplated that this invention will be widely applicable over a wide range of wireless devices. Accordingly, it will be understood by those skilled in the art having reference to this specification that this description is provided by way of example only, and is not to unduly limit the true scope of this invention as claimed.

Figure 1:
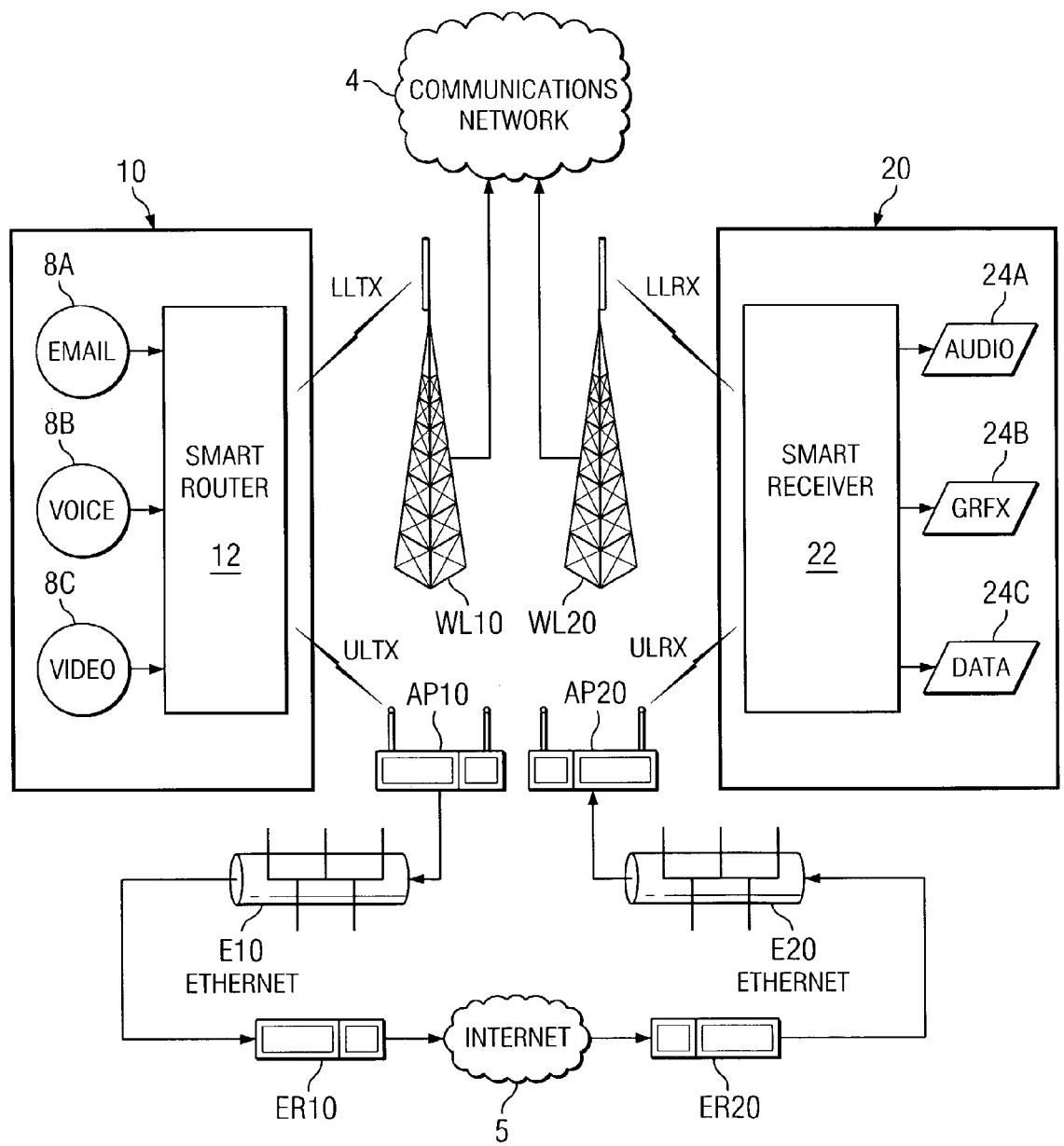
FIG. 1 is an electrical diagram, in block form, of a wireless communications network including at least one wireless device constructed according to the preferred embodiment of the invention.

Referring now to FIG. 1, an example of an implementation of a communications system including devices constructed according to the preferred embodiment of the invention will now be described. As mentioned above, it is contemplated that the particular devices utilizing this invention can vary widely in form and function, and as such the system of FIG. 1 is presented somewhat generically, in the form of a data flow diagram, by way of example only. It is contemplated that other types of devices, other types of data traffic, and also different classes of wireless communications links, in combination with wired or landline communications facilities, may also be involved in implementations of this invention.

In the example of FIG. 1, device 10 is a wireless-enabled communications device capable of generating communications of multiple types, and also capable of transmitting over multiple wireless links, including both licensed and unlicensed frequencies, as will be described below. An example of device 10 is a personal digital assistant (PDA) with wireless telephone capability, or alternatively a wireless telephone handset with data and video capability. In this example, device 10 includes multiple message sources 8, including an email application 8A, voice telephony input 8B corresponding to a microphone and digital signal processing capability for formatting voice communications, and video input 8C corresponding to a digital camera and signal processing capability for generating video communications. Other examples of message sources include sources of data files, transmittable as attachments to other messages, and graphics information such as in the form of a browser window.

The information transmitted from each of the multiple message sources 8A through 8C has different attributes, and different communication requirements. For example, voice communications from voice telephone input 8B are preferably communicated with low delay and jitter, so that one party does not talk over the other due to delay; these voice communications can be carried out at relatively low data rates, however, as compared with other communications. Email messages from email application 8A can tolerate large delays in time, but may have high bandwidth requirements, especially for large attachments or graphics intensive messages. On the other hand, as mentioned above, the unlicensed and licensed bands provide different performance with regard to time fidelity (i.e., delay and jitter) and data rates (i.e., bandwidth). According to this invention, transmitting device 10 is capable of routing transmitted traffic in a way that takes advantages of these different attributes and requirements of messages, and of the different performance and cost of the available frequency bands.

In the data flow context of FIG. 1, each of message sources 8A through 8C is coupled to smart router 12. Smart router 12 corresponds to circuitry and executable program instructions for routing the communications from message sources 8A through 8C to selectable ones of multiple wireless links LLTX, ULTX. As will become apparent from the following description, complete messages from any one of sources 8A through 8C may be transmitted by device 10 over either of the multiple wireless links LLTX, ULTX, or a single message including components of multiple types (i.e., a voice transmission with accompanying video, data files as attachments to voice or email transmissions, etc.) may be transmitted over different ones of the multiple wireless links LLTX, ULTX.

According to this embodiment of the invention, licensed wireless link LLTX carries signals in licensed frequency bands, and unlicensed wireless link ULTX conversely carries signals in unlicensed frequency bands. In this example, licensed wireless link LLTX is a wireless telephone channel. As shown in FIG. 1, licensed wireless link LLTX communicates signals from device 10 to wireless base station WL10, which in turn forwards the communication to network 4 in the conventional manner. Network 4 may be either a circuit-switched network, or a packet-based network. In this example, network 4 may be considered as a telephone network, for example as used to carry voice communications, but alternatively network 4 may instead correspond to a data network, or may carry both data and voice communications. Unlicensed wireless link ULTX, in this exemplary embodiment of the invention, is a wireless local area network (LAN) link to a wireless network access point AP10, which in turn communicates the signals via Ethernet network E10 and router ER10 to the Internet 5.

Licensed link LLTX in this example is licensed, in that the user of device 10 has contracted with a wireless telephone service provider to carry outgoing traffic from device 10 to network 4. Typically, as is well known in the art, this contract typically involves a fee paid by the user to the service provider, for example a monthly fee for a specified number of minutes of communication, a per-minute charge, or a combination of the two. The communications over licensed link LLTX may be modulated according to the particular manner specified by the service provider. Examples of these modulation techniques include TDMA, CDMA, GSM, GPRS, and the like, as known in the art. Examples of the licensed frequency bands corresponding to licensed link LLTX include those around 800 MHz that are licensed for conventional mobile cellular telephony, and those around 1.9 GHz that are licensed for mobile personal communication services (PCS).

Unlicensed link ULTX, on the other hand, is unlicensed in that its frequencies of operation fall within unlicensed frequency bands in the spectrum, for example within the ISM band. Examples of communications that are carried out in these unlicensed bands, and in particular as carried out over unlicensed link ULTX in the example of FIG. 1, include the wireless LAN communications under the well-known IEEE 802.11 standards, examples of which include the 802.11a, 802.11b, and 802.11g standards, and those communications under the well-known Bluetooth standard, all operating at frequencies in the 2.4 GHz band. The types of data traffic that can be carried over unlicensed link ULTX include all conventional types of traffic, including computer data, commands, voice over Internet protocol (VoIP) traffic, and others. According to this invention, it is contemplated that the so-called "push to talk" (PTT), or half-duplex, communications are particularly attractive for VoIP transmission over unlicensed bands, considering that latency is not of concern in PTT communications.

In the example of FIG. 1, transmissions from device 10 over licensed link LLTX continue through network 4, while transmissions from device 10 over unlicensed link ULTX continue over the Internet 5. In this exemplary embodiment of the invention, device 20 is capable of receiving multiple-channel wireless transmissions.

For wireless telephone transmissions from device 10 over network 4, wireless device 20 receives the communications by way of a licensed wireless link LLRX via wireless base station WL20. In this example, some or all of the telephone communications may be carried over landline links, depending upon the switching networks involved and distance traveled between device 10 and device 20. For transmissions from device 20 via the Internet 5, wireless device 20 receives the communications by way of router ER20, Ethernet LAN E20, and wireless access point AP20, with the wireless transmissions communicated from access point AP20 by way of the appropriate 802.11 or Bluetooth standard unlicensed communications link ULRX.

In either case, however, network 4 and the Internet 5 may include various technologies. For example, multiple wireless "hops" may be made within network 4, and telephone network 4 may include wired portions, as well. As mentioned above, network 4 may be a circuit-switched network, or alternatively a packet-based network. In short, both of network 4 and the Internet 5 may include either wired or wireless "backhauls". In addition, other communications channels may also be included in the system of FIG. 1, and utilized in an analogous manner.

According to this embodiment of the invention, wireless device 20 includes smart receiver 22, which has the functionality to receive communications over either or both of licensed link LLRX and unlicensed link ULRX. As mentioned above relative to device 10, the transmitted communications may be of various types, or may be a single message including multiple types of information; examples of these communication classes include email, voice signals, video or graphics signals, data files as attachments to communications, and the like. Smart receiver 22 is capable of receiving these various types of message data, and of forwarding the appropriate messages or components to output functions such as audio output 24A, graphics output 24B, and data storage 24C.

Receiving device 20 may also correspond to a conventional mobile wireless telephone, personal computer or workstation, landline telephone, a wireless-capable device for playing streaming media, or the like. In this event, it is possible that receiving device 20 may not have the capability of receiving the communications transmitted by device 10; for example, a conventional telephone will not have video capability, but only able to receive the voice signal. In this event, those portions of the communication that are not compatible with device 20 will be ignored.

The data flow diagram of FIG. 1 illustrates transmission of communications only in a single direction, namely from device 10 to device 20. Of course, communications are often bidirectional with each device 10, 20 both transmitting and receiving.

Figure 2:
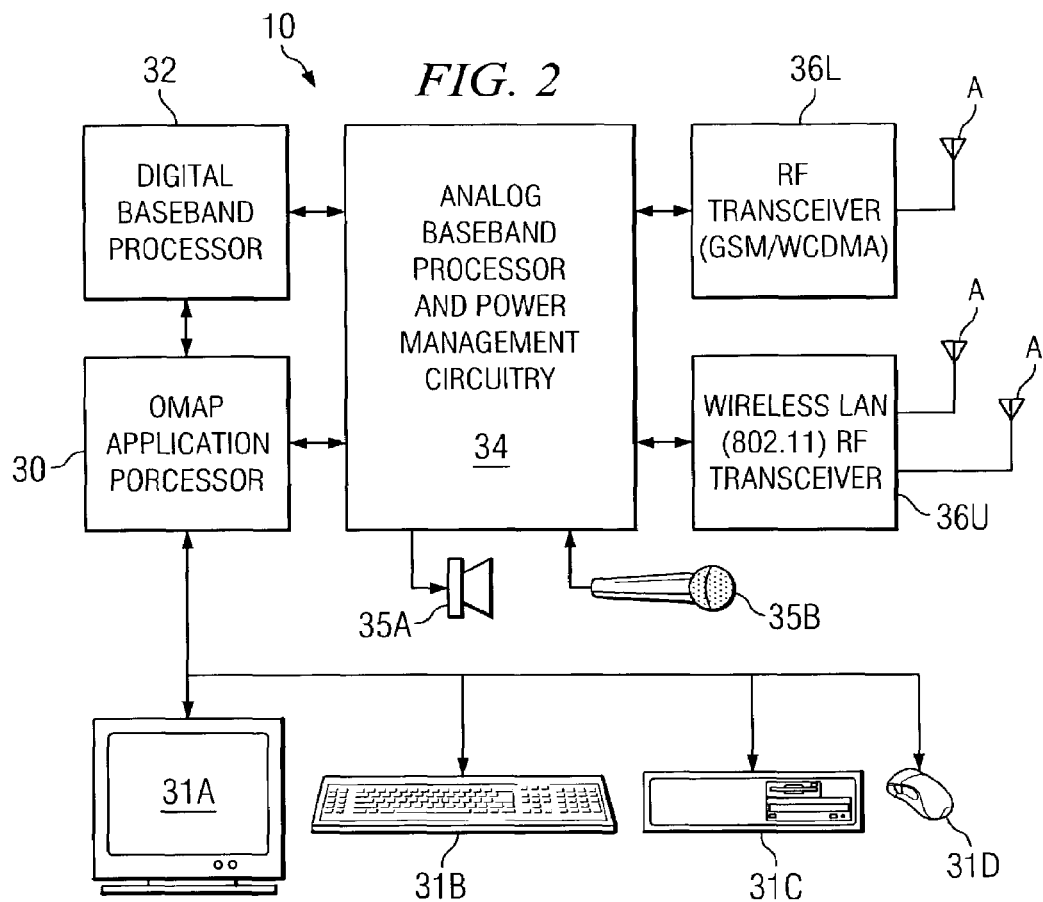
FIG. 2 is an electrical and data flow diagram, in block form, of a wireless device constructed according to the preferred embodiment of the invention.

Referring now to FIG. 2, an example of the construction of device 10 according to this invention will now be described. Again, as mentioned above, it is contemplated that the particular construction of device 10 can vary widely, ranging in overall function from a PDA or palmtop computer to a mobile wireless telephone handset with 3G functionality. As such, the architecture illustrated in FIG. 2 is presented by way of example only. Those skilled in the art having reference to this specification will be readily able to implement this invention in such other architectures and hardware that are suitable for particular implementations.

In addition, it is contemplated that receiving device 20 may be similarly constructed. In fact, it is contemplated that transmitting device 10 will itself have the capability of receiving transmissions over both licensed and unlicensed bands. Accordingly, this description of the construction of device 10 is also contemplated to correspond to the construction of receiving device 20. Alternatively, receiving device 20 may be a conventional mobile telephone handset, computer system, or landline telephone, capable of receiving messages of various types; or further in the alternative, device 20 may have single channel capability, in which case it is only capable of receiving one of the communication modes transmitted by device 10.

The exemplary construction of device 10, according to this embodiment of the invention, somewhat follows a reference design for a dual mode Universal Mobile Telecommunications Services (UMTS), as published by Texas Instruments Incorporated. In this example, device 10 includes control processor 30, which in this example is an OMAP application processor available from Texas Instruments Incorporated. Processor 30 provides control and interface functions to the input and output peripherals 31A through 31D. In this example, these peripherals include LCD display 31A, keypad 31B, buzzer 31C, and LEDs 31D. Other peripherals, such as digital cameras, Bluetooth network adapters, memory cards, and the like may also be controlled by and coupled to processor 30. In this embodiment of the invention, it is contemplated that processor 30 includes such functions as program and data memory resources realized by random access memory (RAM) and read-only memory (ROM), various interface functions for coupling to peripherals 31 such as UART functions and the like. As known in the art, the OMAP application processor available from Texas Instruments Incorporated is realized in a dual processor architecture, including an ARM microprocessor and a digital signal processor (DSP), each of which are programmable by way of program instructions, such as may be stored within on-chip ROM or off-chip non-volatile memory.

Processor 30 is coupled to digital baseband processor 32 and analog baseband processor 34, each of which include the appropriate circuitry and software control to carry out conventional baseband processing of the signals to be transmitted, and also the signals received, by device 10. Digital and analog baseband processors 32, 34, respectively, are also preferably bidirectionally coupled to one another. In this example, digital baseband processor 32 preferably includes such functions as an ARM processor and a DSP, along with data and program memory resources in the form of RAM and ROM, all arranged to perform digital processes as encoding and decoding, forward and inverse discrete Fourier transforms (DFT), and the like as appropriate for the particular modulation (and demodulation) methods used by device 10. An example of a suitable digital baseband processor 32 is the TBB4105 Digital Baseband Processor integrated circuit available from Texas Instruments Incorporated. Analog baseband processor 34 includes the appropriate functionality for signal processing in the analog domain, such processes including analog codec functionality, analog filtering, analog decoding, conversion to and from the analog domain from the digital domain, and interfacing with speaker 35A and microphone 35B. Analog baseband processor 34 according to this embodiment of the invention also preferably handles power management functions for device 10. An example of a suitable analog baseband processor 34 is the TWO3024 Analog Baseband and Power Management integrated circuit available from Texas Instruments Incorporated. In some modem processors, both of the digital baseband processor 32 and analog baseband processor 34 functions are incorporated into the same single integrated circuit. Examples of these devices include the BRF6100/6150 RF and baseband processors, and the TNETW1100/1100b/1130 single-chip medium access controllers and baseband processors, all available from Texas Instruments Incorporated.

Analog baseband processor 34 is bidirectionally coupled to radio frequency (RF) transceiver 38L and to wireless LAN RF transceiver 36U. RF transceiver 38L may be implemented as a conventional device for transmitting and receiving mobile wireless communications over one or more licensed radio bands, including the appropriate filters and RF circuitry for accomplishing such functions. Preferred examples of RF transceiver 36L include the TRF6151 RF Transceiver, for GSM and GPRS communications, and the TRF6301 RF Transceiver, for WCDMA communications, both available from Texas Instruments Incorporated. Wireless LAN RF transceiver 36U corresponds to the appropriate circuitry for carrying out RF communications in an unlicensed band, such as the 2.4 GHz ISM band as used in wireless LAN communications under the 802.11 standards, and as the 5.2 GHz unlicensed band. The functions performed by RF transceiver 36U also includes the modulation and analog demodulation, amplification, and filtering of RF signals received or to be transmitted over the wireless channel RF circuitry 33. RF transceiver 36U may be incorporated into the same integrated circuit as other functions, such as digital baseband processor 32 and analog baseband processor 34, for example as implemented in the BRF6100 and BRF 6150 RF and baseband processors available from Texas Instruments Incorporated, which are suitable for communications in the 2.4 GHz band according to the Bluetooth and wireless LAN standards, respectively. Other baseband devices, such as the TNETW1100/1100b/1130 single-chip medium access controllers and baseband processors available from Texas Instruments Incorporated and mentioned above, will be used in combination with a conventional RF device that carries out the functions of RF transceiver 36U.

In the example of device 10 shown in FIG. 2, each of RF transceivers 36L, 36U are bidirectionally coupled to one or more antennae A, so that communications over the licensed and unlicensed bands can be alternately or simultaneously carried out. Typically, it is expected that multiple antennae A will be incorporated into device 10, such that each RF transceivers 36L, 36U will communicate using one or more dedicated antennae; alternatively, it is contemplated that an antenna sharing arrangement may also be realized. It is contemplated that those skilled in the art having reference to this specification can readily construct the appropriate circuitry to accomplish this function.

It is contemplated that transceivers 36L, 36U will typically operate simultaneously, so that communications are carried out simultaneously over the licensed and unlicensed bands. In some mobile telephony environments, however, the wireless handsets are assigned time slots for communication with the base station. For example, the wireless handset may be allocated two out of eight time slots for communication with the base station, in which case the handset uses the other six time slots to look for and analyze neighboring base stations for hand-off. According to an alternative implementation of the preferred embodiments of the invention, device 10 may have the capability to alternately transmit portions of the communication in the licensed band via transceiver 36L during its allocated time slots, and transmit over the unlicensed band via transceiver 36U during the otherwise unused time slots (during which transceiver 36L can be looking for base stations for hand-off, in the conventional manner). By using the unlicensed bands in time slots that are not available to the device in the licensed bands, this alternating transmission approach can improve the data rate of the overall transmission, and may also increase the robustness of the wireless links by reducing self-interference.

Figure 3:
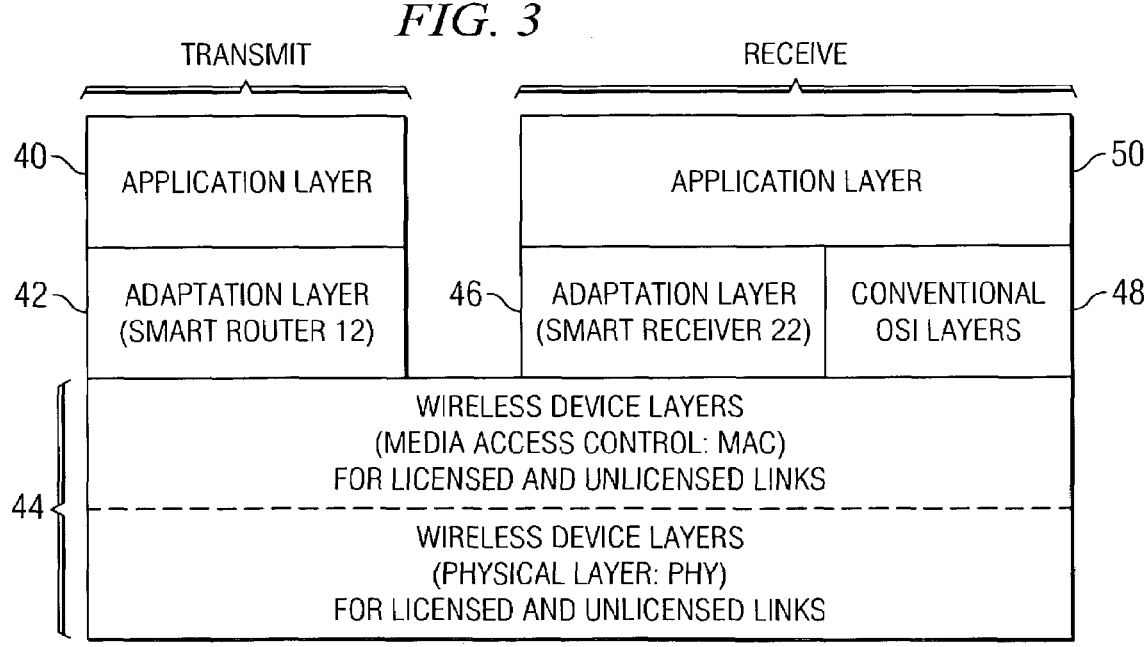
FIG. 3 is a layer diagram illustrating the software layers utilized according to the preferred embodiment of the invention.

Referring back to FIG. 1 in combination with FIG. 2, it is contemplated that smart router 12 will be substantially implemented as software routines executable by OMAP application processor 30, with the software routines stored as sequences of executable instructions stored in program memory of processor 30, for example in ROM. Referring now to FIG. 3, the protocol layer framework for implementing communications according to the system of FIG. 1, according to the preferred embodiments of the invention, will be described in detail.

The system of FIG. 1 is preferably defined as having three layers. From the transmit side, these three layers include application layer 40, adaptation layer 42, and wireless device layer 44. Application layer 40 corresponds to message sources 8A through 8C of FIG. 1, and are the application sources of messages to be transmitted over the licensed and unlicensed bands according to the preferred embodiment of the invention. Adaptation layer 42 corresponds to smart router 12 of FIG. 1, in which the traffic to be transmitted is allocated to the optimal wireless links as will be described in further detail below. Wireless device layer 44 corresponds to the wireless transceivers, including conventional MAC and PHY layers for wireless communications over licensed mobile telephony bands, and for wireless LAN communications.

On the receive side, adaptation layer 46 is provided for those devices, such as device 20, that include smart receiver 22 as in the example of FIG. 1. Alternatively, received messages may be processed through conventional wireless network or telephony OSI layers 48. In either case, application layer 50 corresponds to the applications processing the output functions 24A through 24C in the example of FIG. 1.

Returning to the transmit side of the system of FIG. 3, adaptation layer 42 corresponds to smart router 12 in device 10 of the system illustrated in FIG. 1, and, with reference to FIG. 2, is preferably implemented by way of processor 30 in combination with software routines as described above. In this embodiment of the invention, adaptation layer 42 receives information from application layer 40 regarding the attributes of messages to be transmitted by device 10, receives information from wireless device layer 44 regarding the attributes of available wireless channels, and determines the optimal routing of the transmitted messages, over licensed and unlicensed wireless communications channels LLTX, ULTX in response to that information. According to this embodiment of the invention, the communication of this information is contemplated to be carried out by way of an application program interface (API), both between application layer 40 and adaptation layer 42, and between adaptation layer 42 and wireless device layer 44.

The communications between application layer 40 and adaptation layer 42 correspond to the requesting of a communication link by an application, for example one of message sources 8A through 8C of FIG. 1, the granting of a communication link by smart router 12, and the transmission and receipt of payload for an open communication link. An example of an API and its commands between application layer 40 and adaptation layer 42 according to the preferred embodiment of the invention is illustrated in this table:

| API command | Direction | Description | Parameters |
| --- | --- | --- | --- |
| open_channel (destination address, QoS parameters) | From application layer 40 to adaptation layer 42 | Indicates that the application intends to open a communications link with device 20 at the specified destination address | Destination address: address of destination device QoS parameters: delay and jitter specifications, bandwidth required |
| channel_open_status (channel_handle, QoS parameters) | Adaptation layer 42 to application layer 40 | Indicates whether the requested channel was successfully opened, and the attributes of that channel | channel_handle: information about the channel, including number of subchannels and corresponding information; QoS parameters: delay and jitter performance, and available bandwidth in the channel |
| data_unit_send (payload, delivery method) | From application layer 40 to adaptation layer 42 | Provides the payload of a message | payload: payload itself delivery method: specifies the channel to be used, or that adaptation layer 42 can select the channel |
| data_unit_receive (payload) | From adaptation layer 42 to application layer 40 | Indicates receipt of specified payload | payload: payload identifier |
| close_channel (channel_handle) | Either direction | Request to close the link | channel_handle: identifies the channel |

Of course, the particular API commands that are implemented in a particular system may vary according to the particular implementation.

Communications between adaptation layer 42 and wireless device layer 44 correspond to the establishing of communication links between the transmitting wireless device (e.g., device 10 of FIG. 1) and a base station (e.g., base station WL10) or wireless LAN access point (e.g., access point AP10), and the characterization and management of these links. Each of the wireless devices, base stations, and access points of course reside in wireless device layer 44. An example of an API according to the preferred embodiment of the invention is illustrated in this table:

| API command | Direction | Description | Parameters |
| --- | --- | --- | --- |
| BS_in_range (BS_handles) | From wireless device Layer 44 to adaptation layer 42 | Base station or access point reports that it is in range of the wireless device (e.g., device 10). Adaptation layer 42 uses this information to make further inquiries | BS_handles: indicates identity of the base station or access point, BSSID, MAC address, QoS features, etc. |
| BS_inquiry (BS_handles) | Wireless device layer 44 to adaptation layer 42 | Wireless device receives a report of all base stations and access points that are in range | BS_handles: see above |
| wireless_channel_status (BS_handle) | Wireless device layer 44 to adaptation layer 42 | Reports channel status to adaptation layer 42 | BS_handle: see above, and also including information such as maximum available rate, SNR, SINR, RSSI, BER, PER, link margin, BSS load |
| Join_BS (BS_handle, Credential, QoS_handle) | Adaptation layer 42 to wireless device layer 44 | Requests that the wireless device connect to a specified base station or access point | BS_handle: see above Credential: data structure required for authentication QoS_handle: includes information such as bandwidth required, etc. |
| Exit_BS (BS_handle) | Adaptation layer 42 to wireless device layer 44 | Indicates that the wireless devices disassociates from the specified base station or access point | BS_handle: see above |
| BS_out_of_range (BS_handle) | Wireless device layer 44 to adaptation layer 42 | Indicates that the base station or access point is now out of range, and that a roaming decision is necessary | BS_handle: see above |
| data_unit_transmit (payload, rate) | Adaptation layer 42 to wireless device layer 44 | Provides the payload to be delivered | payload: payload itself rate: minimum rate of transmission |
| data_unit_receive (payload) | Wireless device layer 44 to adaptation layer 42 | Indicates receipt of payload | payload: identifies the received payload |

Again, the particular API commands that are implemented in a particular system may vary according to the particular implementation.

According to the preferred embodiment of the invention, smart router 12 executes the appropriate software routines of adaptation layer 42, to allocate a message to be transmitted among the licensed and unlicensed bands, and corresponding links LLTX, ULTX that are available to device 10 at the time. This allocation is carried out according to one or more various optimization criteria, as will now be described in detail relative to FIGS. 4a through 4c.

Figure 4A:
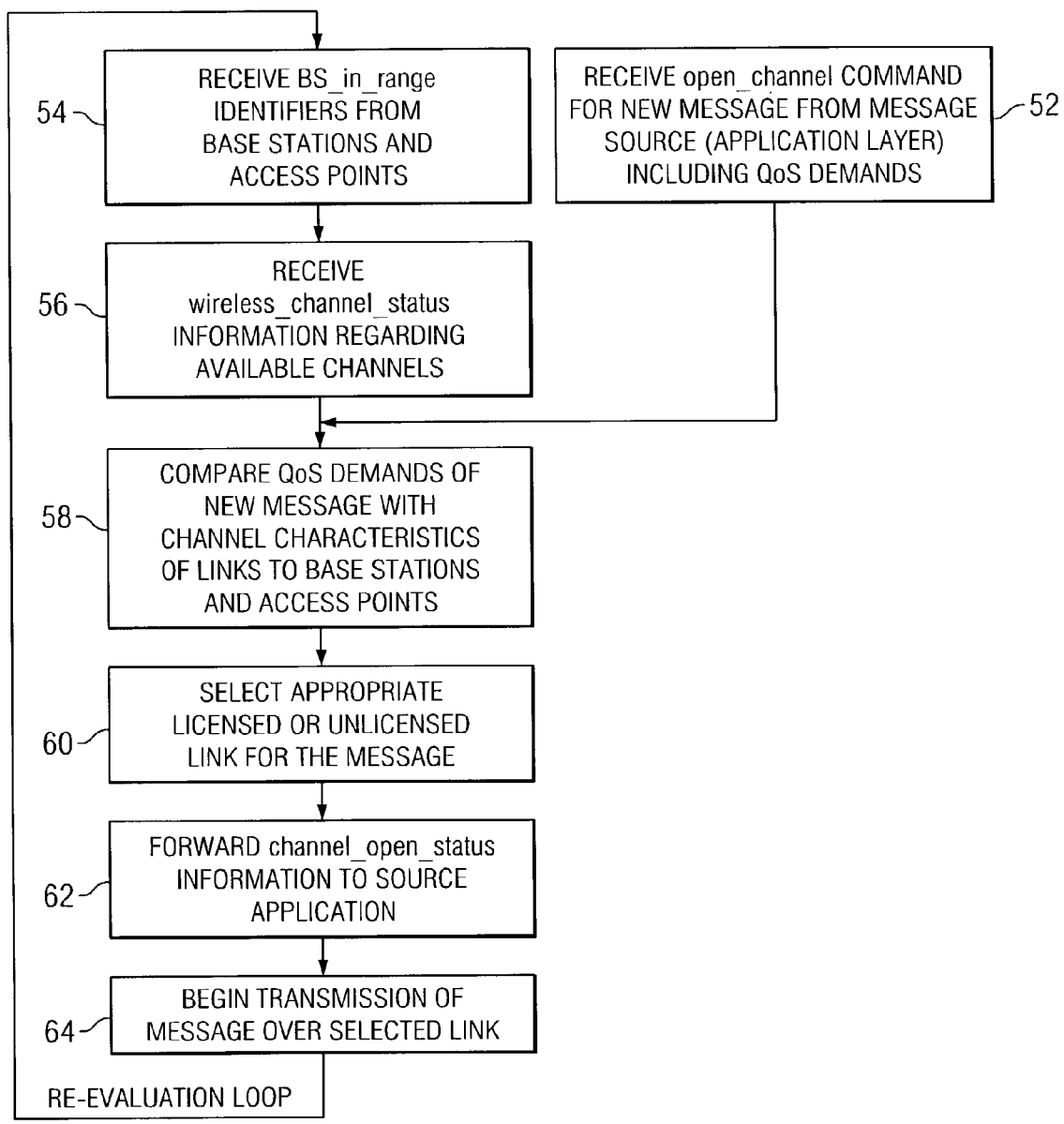
FIGS. 4a through 4d are flow diagrams illustrating the operation of the allocation of frequency bands according to various embodiments of this invention.

In the example of FIG. 4a, smart router 12 operates to allocate messages to the licensed and unlicensed band according to quality of service (QoS) constraints. In this embodiment of the invention, it is contemplated that those message types that do not require a high level of transmission quality (including jitter, time delay, and the like) may be transmitted over unlicensed bands, particularly if the bandwidth requirement (i.e., data size) for the message is substantial. On the other hand, it is preferred to use a licensed band for those message types that have channel quality constraints. The method illustrated in FIG. 4a allocates the frequency bands in this manner, as will now be described for the example of FIG. 1.

In process 52, smart router 12 receives an open_source API command from one of message sources 8A through 8C, indicating that a new message is to be transmitted, and including parameters that describe the QoS demands of this message. As described above, these parameters describe such QoS requirements as jitter, time delay limits, and bandwidth requirements. Additional QoS requirements may also be included in these parameters, for example including an upper limit on bit error rate and the like. Smart router 12 also receives or has received, in process 54, identifiers of those base stations and access points that are in range of device 10, and receives or has received, in process 56, information regarding these available wireless communications channels, specifically relating the QoS parameters. In this example, process 54 is carried out by execution of the BS_in_range API command described above, and process 56 refers to execution of the wireless_channel_status API command also described above.

Also in this example, base stations refer to conventional mobile wireless telephone base stations such as WL10 in FIG. 1, supporting licensed band communications via licensed frequency band link LLTX, while access points refer to wireless receivers for carrying out unlicensed band wireless communications, such as over unlicensed frequency band link ULTX to access point AP10 in the system of FIG. 1. Of course, the particular system network elements in place for the licensed and unlicensed bands may vary with the particular system arrangement.

In process 58, smart router 12 analyzes the QoS requirements for the message received in process 52, along with the wireless channel information for the available links received in processes 54 and 56, to determine the desired allocation of the message to the licensed and unlicensed bands. This analysis may be carried out in any one of several ways, depending upon the complexity and precision required. One example of analysis process 58 may follow a rules-based approach, by way of which a priority or other arbitration decision may be enacted. According to another approach, a "cost function" involving the message requirements and the channel attributes may be minimized or otherwise optimized, to arrive at an allocation. Further in the alternative, an adaptive approach may be utilized. It is contemplated that those skilled in the art, having reference to this specification, will be readily able to implement the appropriate analysis and optimization functionality into smart router 12, for example by way of a software routine executable by processor 30 of FIG. 2. In process 60, smart router 12 selects the appropriate one of the licensed link LLTX and unlicensed link ULTX for use in the new message.

Various examples of the analysis and selection processes 58, 60 are contemplated. For example, if the message indicated in process 52 is an email message, especially including a significant attached file, it is contemplated that smart router 12 will transmit the email by way of an unlicensed band if available, considering that the email message is not real-time traffic so that its timing constraints are not critical, and also considering that the size of the email message can consume significant bandwidth for efficient transmission. Conversely, if the message indicated in process 52 is a voice telephone call, smart router 12 will tend to transmit the voice call over a licensed band, considering that the voice call has timing constraints including delay and jitter requirements, and also considering that only modest bandwidth is necessary for voice communications.

Returning to FIG. 4a, in process 62 smart router 12 forwards information regarding the channel selected in process 60 to the requesting message source 8A through 8C (i.e., the application layer) by way of the channel_open_status API command described above, in this example. This command includes confirmation of the channel selected, and also provides information regarding the QoS performance of that channel, for potential use by the application in its data preparation and forwarding functions. Assuming that the channel parameters are adequate, transmission of the message over the selected communications link LLTX, ULTX then begins, in process 64. In this example, as described above, transmission process 64 is carried out by way of data_unit_send and data_unit_receive API commands.

According to this exemplary embodiment of the invention, therefore, the transmitting device determines the optimal routing of messages that it is to transmit, among the available licensed and unlicensed bands. When both band types are available to the device, the allocation of non-time-sensitive high bandwidth communications to unlicensed bands greatly improves the efficiency at which the costly licensed bands are used, reserving these bands for time-sensitive traffic in this example. For example, Internet browsing ("web") traffic can be carried out by smart router 12 transmitting over unlicensed bands when available, and otherwise using licensed bands, with smart router 12 changing from one band to the other as channel conditions change, preferably without the user becoming aware of the changes. Besides the efficiency achieved at the device level, it is contemplated that this optimum allocation is especially beneficial to the licensed communications service provider, by freeing bandwidth in the licensed bands so that a higher density of communications can be carried over the narrow and expensive licensed bands.

It is contemplated that the receiving device (e.g., device 20 of FIG. 1) is capable of receiving the transmitted message over the appropriate facility available to it. In one example, device 20 includes the capability of communicating over either licensed or unlicensed bands, and may be of similar or identical construction as device 10; in such an example, smart receiver 22 in device 20 is capable of receiving the incoming communication over the allocated band from the transmit side, and of forwarding the message to the appropriate output device 24. Alternatively, device 20 may have single band capability, in which case its receipt of the message will depend upon the ability of the transmitted message, over the selected medium, to be received by device 20.

It is contemplated that, according to the preferred embodiments of the invention, that the channel conditions may be re-evaluated from time to time. This re-evaluation is especially beneficial considering that the wireless devices are likely to be mobile, so that the distances to and from the corresponding base stations and access points will vary over time and place, as will the identify of the base stations and access points that are in range of device 10. Accordingly, re-evaluation of the channel conditions is performed according to this invention by smart router 12 repeating process 54 to obtain identifiers of those base stations and access points that are in range, for example by way of the BS_in_range API command described above, and repeating process 56 to receive information regarding the available channels, for example by way of the wireless_channel_status API command also described above. To the extent that the information regarding the available channels changes over time, analysis process 84 re-analyzes the channel information relative to the message information now present in process 58, and may effect a new selection in process 60.

Figure 4B:
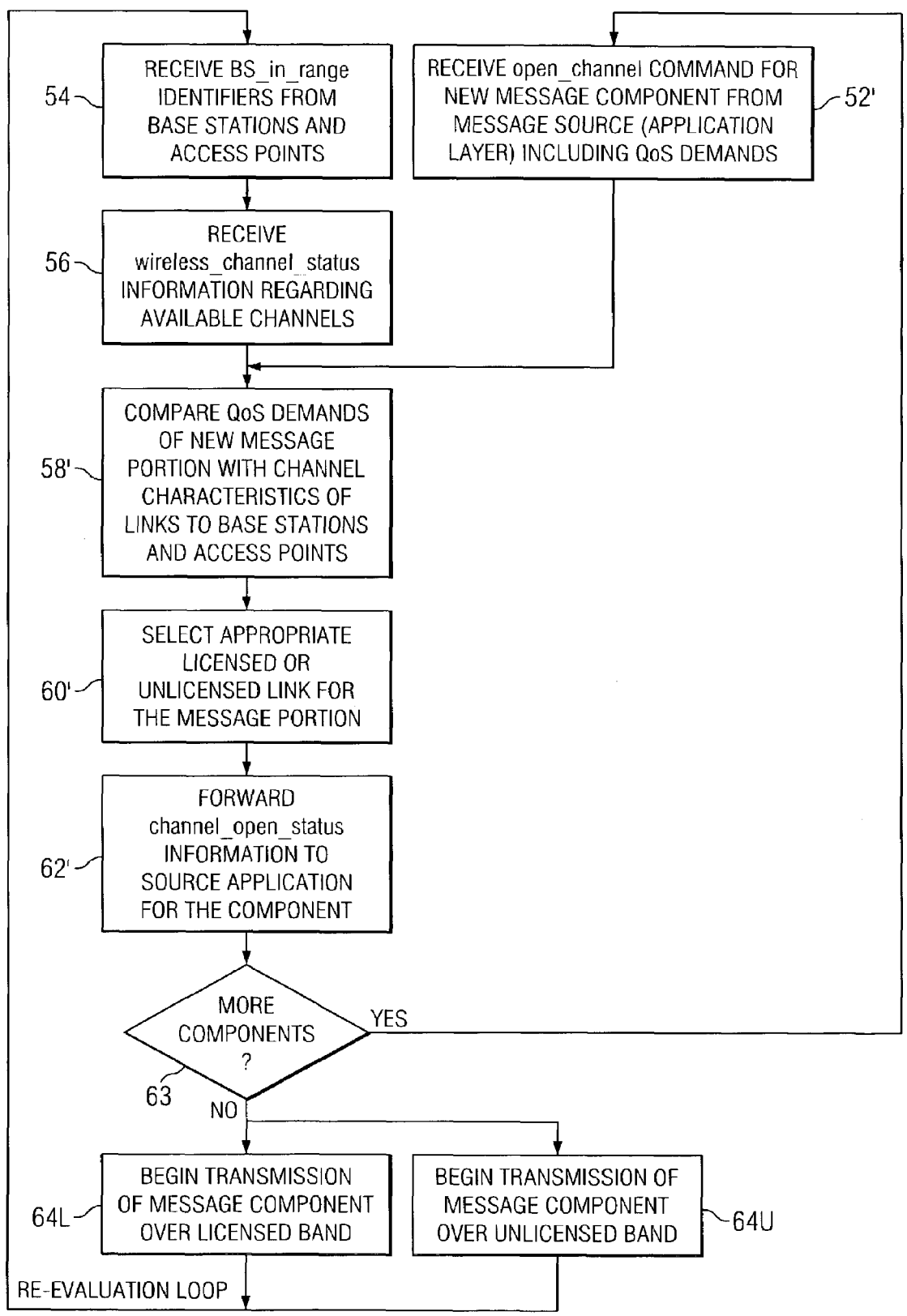

FIG. 4b illustrates another exemplary embodiment of this invention, in which a multicomponent message is transmitted over both licensed and unlicensed bands. An example of such a message is a so-called "videophone" communication, in which voice traffic is combined with a corresponding real-time video signal, permitting the communicating parties to view each other while engaging in conversation. Another example is the transmission of streaming video in combination with its associated streaming audio. In FIG. 4b, identical processes as those in FIG. 4a are referred to by the same reference numerals.

In processes 54, 56, as before, smart router 12 receives the identifiers and attributes of the available wireless links supported by the base stations and access points in range of device 10. In process 52', smart router 12 receives a request regarding one of the components of a multicomponent message, including the QoS requirements for that component of the message. In process 58', smart router 12 analyzes the requested message component relative to the available channels and their attributes, as before, and the result of the analysis of process 58' is used to select the appropriate communications channel for that component, over a licensed band or an unlicensed band, in process 60'. This result is communicated back to the message source, in process 62'. To this point, the operation of smart router is substantially identical to that described above relative to FIG. 4a, except that the allocation of FIG. 4b is for a single component of a multicomponent message.

In decision 63, smart router 12 determines whether additional components remain to be analyzed for allocation to a communications channel. If so (decision 63 is YES), control returns to process 52' for receipt of the open_channel API command requesting a channel for the transmission of the next component, and including the attributes of that component. Analysis, selection, and communication processes 58', 60', 62' are then repeated for this component, as is decision 63.

Upon completion of the allocation of all components of the transmission (decision 63 is NO), transmission of one or more components over the licensed link LLTX is initiated in process 64L, and transmission of one or more components over the unlicensed link ULTX is initiated in process 64U. These components are then received at the destination device 20 and, in the case where device 20 has the capability of receiving message components from multiple bands, smart receiver 22 sequences the components together for forwarding to the appropriate output functions 24 in time relation with one another.

According to this embodiment of the invention, a multiple component message or transmission is communicated in an efficient manner over licensed and unlicensed bands. For the example of a videophone communication, the time-sensitive audio signals may be communicated over the low-latency licensed bands via licensed link LLTX, while the less-time-sensitive corresponding video signals, which generally require a great deal of bandwidth, are communicated over the unlicensed bands via unlicensed link ULTX. Again, this permits the telecommunications carrier to better utilize its precious licensed bands, particularly where the licensed bandwidth is limited.

The foregoing embodiments of the invention allocate the licensed and unlicensed bands using QoS parameters of the channels, and QoS requirements of the message types, in the analysis and allocation. It is contemplated, according to this invention, that other attributes may alternatively be used in this allocation. Two additional examples will now be described relative to FIGS. 4c and 4d.

Figure 4C:
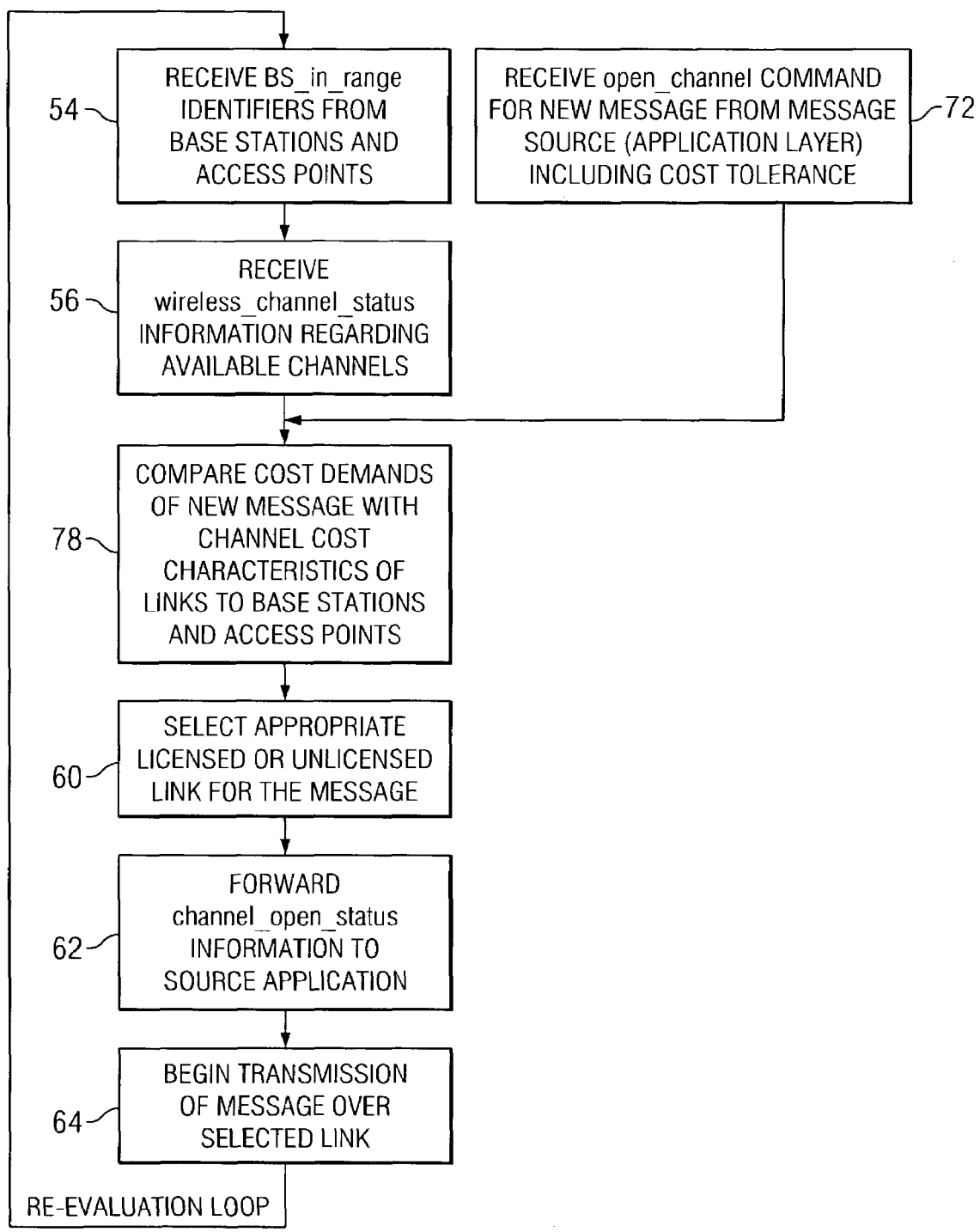

In the example of FIG. 4c, the allocation of frequency bands is made based on channel cost, in the economic sense. Processes 54, 56 are performed so that smart router 12 is aware of the attributes of the available communications channels, including both licensed and unlicensed bands, and including the cost attributes of those channels to device 10. In the receipt of the open_channel API command in process 72, smart router 12 receives information from the corresponding message source relating to its cost tolerance. For example, the owner of device 10 may have set some preferences regarding the use of licensed bands for the various message types, such as by permitting email to be sent over a licensed band only when the cost per minute is below a specified threshold. Of course, other factors such as size of the message, the recipient identity, and perhaps a priority for the message, may also be factored into this cost tolerance information for the message.

In process 78, smart router 12 analyzes the cost tolerance of the message (or message component) and the cost parameters of the available channels, and optimizes the allocation of the message based on this information. As in the other embodiments of this invention, this analysis can be carried out in various ways, including rule-based and optimization techniques. In process 60, the selection of a licensed or unlicensed band is made for the message, and the result is communicated back to message source 8 in process 62, as before. Transmission over the selected frequency lint LLTX, ULTX is then initiated and carried out with process 64.

Other examples of message traffic that can be allocated in this manner include the uploading of data files, which require significant bandwidth and thus are preferably communicated over the low-cost unlicensed band. Another example is the use of licensed bands for the communication of text-based Internet pages, and unlicensed bands for communication of graphical website information.

Figure 4D:
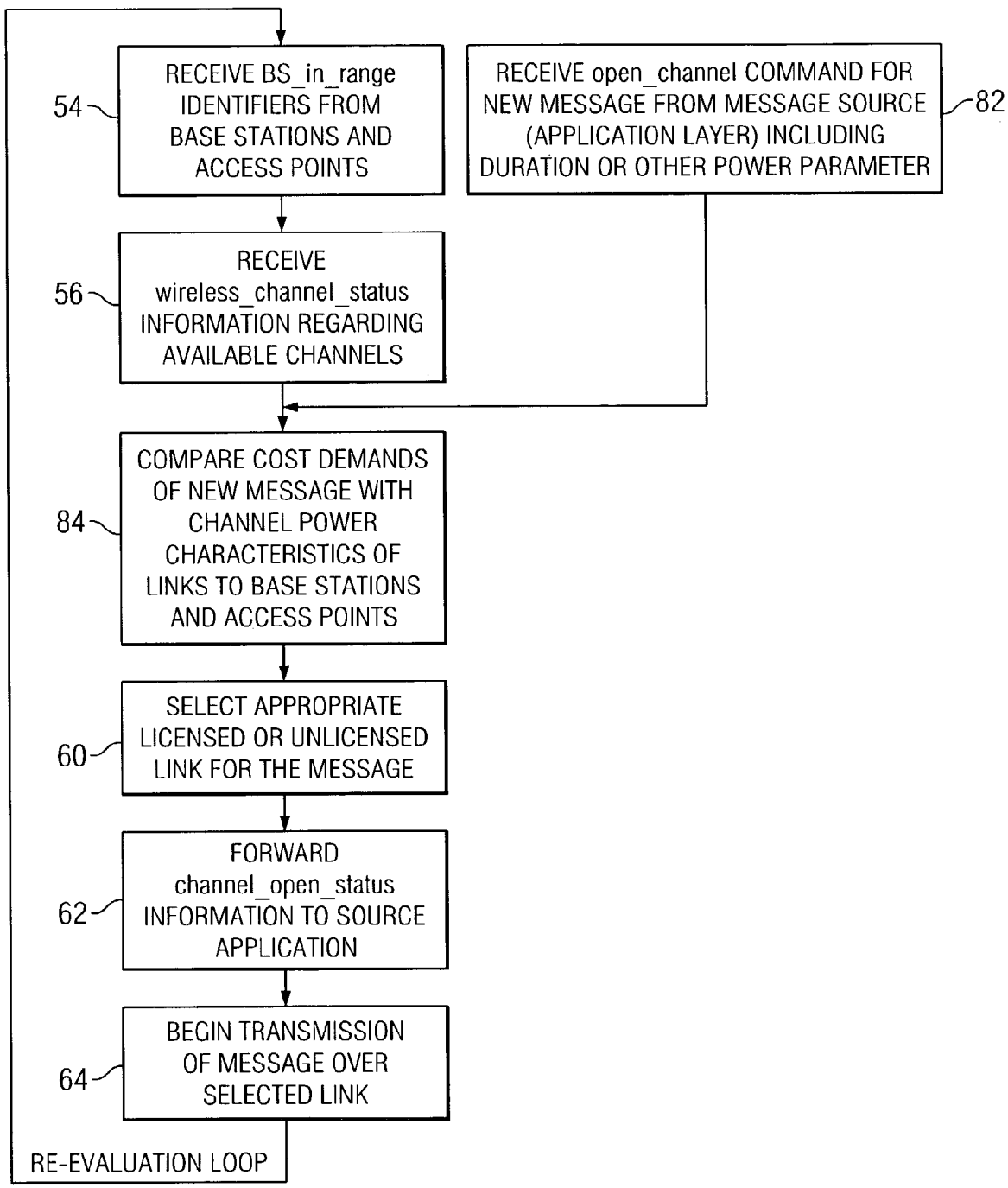

FIG. 4d illustrates another exemplary embodiment of the invention, in which the allocation of a message or message component to licensed and unlicensed bands is based upon expected power consumption of the available channels. As such, this embodiment of the invention is particularly beneficial when applied to mobile, battery-powered, wireless communication devices.

In this embodiment of the invention, in processes 54, 56, smart router 12 receives information regarding the available channels, including an indication of the power consumption of each of the channels. As known in the art, various factors regarding wireless communications channels determine the power consumption of the channels. These factors include the spectral power density (SPD) limits of the channel, which govern the signal power and thus limit the signal-to-noise ratio of the transmission, the distance over which the wireless transmission is to be made between device 10 and base station WL10 or access point AP10, and the like. In process 82, smart router 12 receives the open_channel API command from one of message sources 8A through 8C, indicating various parameters regarding the message to be transmitted, including the data rate and size requirements of the message, each of which relate to the duration of the message and the expected power consumption. In addition, it is contemplated that QoS factors and bandwidth requirements regarding the proposed message will also be pertinent, for example at least to define a minimum desired transmission channel requirements.

In process 84, smart router 12 analyzes the power demand of the message relative to the power consumption information of the available channels. As before, the analysis of process 84 may be carried out in any one of a number of ways, including rule-based decisions, adaptive processes, or optimization of a cost function. In process 60, smart router 12 selects the licensed or unlicensed bands to be used for transmission of the message, and in process 62, smart router 12 notifies the message source application of the selected channels. Transmission of the message over the selected link LLTX, ULTX then commences and continues in process 64.

It is contemplated that the channel allocation according to this embodiment of the invention will be useful in saving battery power, while still providing adequate communication transmission quality.

According to each of the preferred embodiments of the invention, the use of licensed frequency bands is made more efficient, by allocating the licensed bands to those message types and communications that are best served by those bands, and by using the available unlicensed bands to the extent available and desirable. The ability of the devices according to this invention to allocate these bands achieves these results without requiring a great deal of user intervention; indeed, it is contemplated that the allocation and re-evaluation according to this invention can often be performed in a manner that is transparent to the user of the device. In addition, this invention is particularly beneficial to the license holders of the licensed bands, as the use of available unlicensed bands for much of the traffic improves the efficiency of the limited and expensive licensed bandwidth, and increases the number of connections that can be supported in the licensed bands.

As mentioned above, the preferred embodiments of the invention enable, among other applications, the simultaneous use of licensed and unlicensed bands for communication of different media types of the same overall message. An example of this application is the communication of text-based Internet pages over licensed bands, and the communication of graphical website information over unlicensed bands. Another example is the communication of audio signals (e.g., voice) over licensed bands and the communication of the corresponding video (e.g., full-motion images of the person speaking the corresponding voice signals) over unlicensed bands. Another example of this multi-component communication is in the online gaming context, in which time-sensitive commands and motion signals are communicated over the licensed bands, and in which the vast majority of the graphical image data, such as backgrounds and character images, are communicated over the unlicensed bands and can indeed be stored a priori at the receiving device.

In these and similar situations, it is contemplated that the communications delays of the transmissions in the different bands will likely not be equal. It is expected that the transmissions in the unlicensed bands will typically be delayed relative to the corresponding transmissions in the licensed bands, because of the protocol design of the unlicensed bands, although in some instances the licensed band transmissions may be more delayed. Accordingly, the receiving device or system preferably includes the ability to synchronize the multiple parts of a single coordinated transmissions that it receives over the different classes of bands at different latencies.

According to the preferred embodiments of the invention, one synchronization approach can be to include some amount of buffer memory at the receiving device, to buffer the lower latency signals (e.g., the voice or audio signals received over the licensed bands) for later synchronization with the higher latency component (e.g., the corresponding video). For example, referring to FIG. 1, smart receiver 22 may include such buffer memory to buffer the licensed band communications, and the corresponding logic circuitry for forwarding the received components to the appropriate output functions 24 in a synchronized manner.

Alternatively, many modern applications and protocols can handle different message components received with different delays. For example, the transport layer under the MPEG4 standard time-stamps each outgoing packet of transmitted media content; the time-stamps are used by a transmitted control track to control the playing device to play the correct content at the appropriate time, in a synchronized fashion. In the streaming context, the control track controls the playing device to read the buffered lower-latency content in a synchronized manner with the higher latency content; if the higher-latency content is delayed beyond the capacity of the buffer, techniques such as freezing the video frame while continuing audio output can be applied. The author or provider of the multimedia content can also design the stream to be robust in light of variations in delay and synchronization among the components. It is therefore contemplated that the devices constructed according to the preferred embodiments of the invention will be capable of handling multicomponent transmissions in this manner. Additionally, according to the preferred embodiments of the invention, the synchronization at the application layer may require the receiving device, or player, to have multiple IP addresses to receive the multiple components of the multimedia communication over the licensed and unlicensed bands.

The foregoing alternative approaches to the allocation of licensed and unlicensed frequency bands for wireless transmissions are presented by way of example only, as it is contemplated that those skilled in the art having reference to this specification will be readily able to derive other criteria for making such allocation. In addition, it is further contemplated that a more global optimization approach may be used in connection with this invention, for example by incorporating each of these factors of QoS, bandwidth, cost, and power consumption factors into a single optimization and allocation decision. These and other alternative realizations are contemplated to be within the scope of this invention as claimed below.

While the present invention has been described according to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

What is claimed is:

1. A method of operating a wireless communications device to allocate wireless communications from that device among licensed and unlicensed frequency bands, comprising the steps of:
    receiving user inputs from at least one input function of the wireless communications device, the user inputs comprising at least a portion of a message to be transmitted;
    determining, in the wireless communications device, a plurality of channel requirements of the message to be transmitted;
    receiving, at the wireless communications device, a plurality of channel attributes regarding a plurality of available wireless channels in licensed and unlicensed frequency bands;
    comparing, in the wireless communications device, at least on of the plurality of channel requirements of the message to at least on of the plurality of received channel attributes;
    selecting, by the wireless communications device, at least one of the available wireless channels for transmission of the message; and
    transmitting, from the wireless communications device, the message over the selected at least one wireless channel.

2. The method of claim 1, wherein the message to be transmitted includes a plurality of message components;
    wherein the determining step determines the channel requirements for each of the plurality of message components;
    and wherein the comparing step compares the channel requirements for each of the plurality of message components to the received channel attributes.

3. The method of claim 2, wherein the selecting step selects one of the available wireless channels corresponding to a licensed frequency band for at least one of the plurality of message components; and wherein the selecting step selects one of the available wireless channels corresponding to an unlicensed frequency band for at least another one of the plurality of message components.

4. A method of allocating wireless communications from a wireless device among licensed and unlicensed frequency bands, comprising the steps of:
    determining channel requirements of each of a plurality of message components comprising a message to be transmitted;
    receiving channel attributes regarding available wireless channels in licensed and unlicensed frequency bands;
    comparing the channel requirements, for each of the plurality of message components of the message, to the received channel attributes;
    selecting at least one of the available wireless channels corresponding to a licensed frequency band for transmission of at least one of the message components, and selecting—one of the available wireless channels corresponding—to an unlicensed frequency band for at least another one of the plurality of message components; and transmitting the message over the selected at least one wireless channel;

receiving a first message component over a licensed frequency band at a receiving device;

receiving a second message component over an unlicensed frequency band at the receiving device; and forwarding the received message components to corresponding output functions of the receiving device.

5. The method of claim 4, further comprising:
synchronizing the first and second message components with one another at the receiving device.

6. The method of claim 5, wherein the first message component corresponds to voice data; and wherein the second message component corresponds to video data.

7. The method of claim 5, wherein the first and second message components correspond to first and second components of a web page.

8. The method of claim 1, wherein of the channel requirements comprise quality of service requirements; and wherein the channel attributes comprise quality of service attributes.

9. A method of allocating wireless communications from a wireless device among licensed and unlicensed frequency bands, comprising the steps of:
determining channel requirements of a message to be transmitted, the channel requirements comprising quality of service requirements that comprise time delay and jitter specifications;
receiving channel attributes, comprising quality of service attributes, regarding available wireless channels in licensed and unlicensed frequency bands;
comparing the channel requirements of the message to the received channel attributes;
selecting at least one of the available wireless channels for transmission of the message; and
transmitting the message over the selected at least one wireless channel.

10. The method of claim 8, wherein the channel requirements further comprise bandwidth parameters.

11. The method of claim 8, wherein the message to be transmitted includes a plurality of message components; wherein the determining step determines channel requirements for each of the plurality of message components; and wherein the comparing step compares the channel requirements for each of the plurality of message components to the received channel attributes.

12. The method of claim 11, wherein the selecting step selects one of the available wireless channels corresponding to a licensed frequency band for at least one of the plurality of message components; and wherein the selecting step selects one of the available wireless channels corresponding to an unlicensed frequency band for at least another one of the plurality of message components.

13. A method of allocating wireless communications from a wireless device among licensed and unlicensed frequency bands, comprising the steps of:
determining, at the wireless communications device, a plurality of channel requirements of a message to be transmitted, the channel requirements comprising a cost tolerance parameter;
receiving, at the wireless communications device, a plurality of channel attributes regarding available wireless channels in licensed and unlicensed frequency bands, wherein at least one of the channel attributes comprise cost attributes of the channels;
comparing, at the wireless communications device, at least one of the plurality of the channel requirements of the message to the at least one of the received channel attributes;
selecting, by the wireless communications device, at least one of the available wireless channels for transmission of the message; and
transmitting, from the wireless communications device, the message over the selected at least one wireless channel.

14. A method of allocating—wireless communications from a wireless device among licensed and unlicensed frequency bands, comprising the steps of:
determining channel requirements of a message to be transmitted, wherein the channel requirements comprising a power-related parameter;
receiving the channel attributes comprising power consumption parameters regarding available wireless channels in licensed and unlicensed frequency bands;
comparing the channel requirements of the message to the received channel attributes;
selecting at least one of the available wireless channels for transmission of the message; and
transmitting the message over the selected at least one wireless channel.

15. A method of allocating wireless communications from a wireless device among licensed and unlicensed frequency bands, comprising the steps of:
determining channel requirements of a message to be transmitted;
receiving channel attributes regarding available wireless channels in licensed and unlicensed frequency bands;
comparing the channel requirements of the message to the received channel attributes;
selecting at least one of the available wireless channels for transmission of the message;
transmitting the message over the selected at least one wireless channel;
after the transmitting step has been initiated, receiving updated channel attributes regarding available wireless channels in licensed and unlicensed frequency bands; and
repeating the comparing, selecting, and transmitting steps using the updated channel attributes.

16. A method of allocating wireless communications from a wireless device among licensed and unlicensed frequency bands, comprising the steps of:
determining channel requirements of a message to be transmitted;
receiving channel attributes regarding available wireless channels in licensed and unlicensed frequency bands;
comparing the channel requirements of the message to the received channel attributes;
selecting a first wireless channel in a licensed band and selecting a second wireless channel in an unlicensed band for transmission of the message; and
simultaneously transmitting a first portion of the message over the first wireless channel and transmitting a second portion of the message over the second wireless channel.

17. A method of allocating wireless communications from a wireless device among licensed and unlicensed frequency bands, comprising the steps of:
determining channel requirements of a message to be transmitted;
receiving channel attributes regarding available wireless channels in licensed and unlicensed frequency bands;

comparing the channel requirements of the message to the received channel attributes;
selecting a first wireless channel in a licensed band and selecting a second wireless channel in an unlicensed band for transmission of the message; and
transmitting a first portion of the message over the first wireless channel during a first time period and transmitting a second portion of the message over the second wireless channel during a second time period.

18. A wireless electronic communications device, comprising:
a display;
an audio output function for outputting audible output to a user;
a plurality of message sources, comprising at least one input function for receiving message inputs from a user, each of the plurality of message sources for producing a message type for transmission over a wireless link;
radio frequency circuitry, for transmitting radio frequency signals in at least one licensed frequency band and in at least one unlicensed frequency band;
a smart router, coupled to each of the plurality of message sources and to the radio frequency circuitry, for allocating message signals corresponding to the message, by executing a sequence of operations comprising:
receiving, from one of the message sources, channel requirements of a message to be transmitted from the message source;
receiving channel attributes regarding available wireless channels in the licensed and unlicensed frequency bands;
comparing the channel requirements of the message to the received channel attributes;
selecting at least one of the available wireless channels for transmission of the message; and
controlling the radio frequency circuitry to transmit the message over the selected wireless channel.

19. The device of claim 18, wherein channel attributes from two or more of the plurality of message sources, each corresponding to one of a plurality of message components, are received in the receiving operation;
wherein the determining operation determines channel requirements for each of the plurality of message components;
wherein the comparing operation compares the channel requirements for each of the plurality of message components to the received channel attributes;
and wherein the selecting operation selects one of the available wireless channels corresponding to a licensed frequency band for at least one of the plurality of message components, and selects one of the available wireless channels corresponding to an unlicensed frequency band for at least another one of the plurality of message components.

20. The device of claim 18, wherein the channel requirements comprise quality of service requirements;
and wherein the channel attributes comprise quality of service attributes.

21. A wireless electronic communications device, comprising:
a plurality of message sources, each for producing a message type for transmission over a wireless link;
radio frequency circuitry, for transmitting radio frequency signals in at least one licensed frequency band and in at least one unlicensed frequency band;
a smart router, coupled to each of the plurality of message sources and to the radio frequency circuitry, for allocating message signals corresponding to the message, by executing a sequence of operations comprising:
receiving, from one of the message sources, channel requirements comprising quality of service requirements that comprise time delay and jitter specifications of a message to be transmitted from the message source;
receiving channel attributes, comprising quality of service attributes, regarding available wireless channels in the licensed and unlicensed frequency bands;
comparing the channel requirements of the message to the received channel attributes;
selecting at least one of the available wireless channels for transmission of the message; and
controlling the radio frequency circuitry to transmit the message over the selected wireless channel.

22. The device of claim 20, wherein the channel requirements further comprise bandwidth parameters.

23. The device of claim 20, wherein the message sources correspond to application programs;
and wherein the operation of receiving channel requirements is performed by way of an application program interface command.

24. The device of claim 23, wherein the operation of receiving channel attributes is performed by way of an application program interface command.

25. A wireless electronic device, comprising:
at least one input function for receiving message inputs from a user;
a display;
an audio output function for outputting audible output to the user;
a plurality of radio frequency transceiver functions, coupled to at least one antenna, for transmitting and receiving wireless communications over a plurality of frequency bands, including at least one licensed frequency band and at least one unlicensed frequency band;
baseband circuitry, coupled to the plurality of radio frequency transceiver functions, for processing information to be transmitted and information received over the plurality of frequency bands corresponding to a plurality of message sources;
programmable processing circuitry, for executing a sequence of operations to allocate messages to be transmitted by the transceiver functions over the licensed and unlicensed frequency bands, the sequence of operations comprising:
determining channel requirements of a message to be transmitted;
receiving channel attributes regarding available wireless channels in the licensed and unlicensed frequency bands;
comparing the channel requirements of the message to the received channel attributes;
selecting at least one of the available wireless channels for transmission of the message; and
controlling one of the transceiver functions corresponding to the selected wireless channel to transmit the message over its corresponding wireless channel.

26. The device of claim 25, wherein channel attributes corresponding to a plurality of message components are received in the receiving operation;
wherein the determining operation determines channel requirements for each of the plurality of message components;

wherein the comparing operation compares the channel requirements for each of the plurality of message components to the received channel attributes;

wherein the selecting operation selects one of the available wireless channels corresponding to a licensed frequency band and one of the available wireless channels corresponding to an unlicensed frequency band for transmitting message components;

and wherein the controlling operation controls one of the transceiver functions corresponding to the licensed frequency band to transmit at least one of the plurality of message components, and controls another one of the transceiver functions corresponding to the unlicensed frequency band to transmit another one of the plurality of message components.

27. The device of claim 25, wherein the channel requirements comprise quality of service requirements;

and wherein the channel attributes comprise quality of service attributes.

28. A wireless electronic device, comprising:

a plurality of radio frequency transceiver functions, coupled to at least one antenna, for transmitting and receiving wireless communications over a plurality of frequency bands, including at least one licensed frequency band and at least one unlicensed frequency band;

baseband circuitry, coupled to the plurality of radio frequency transceiver functions, for processing information to be transmitted and information received over the plurality of frequency bands corresponding—to a plurality of message sources;

programmable processing circuitry, for executing a sequence of operations to allocate messages to be transmitted by the transceiver functions over the licensed and unlicensed frequency bands, the sequence of operations comprising:

determining channel requirements comprising wherein the quality of service requirements comprise time delay and jitter specifications of a message to be transmitted;

receiving channel attributes regarding available wireless channels in the licensed and unlicensed frequency bands;

comparing the channel requirements of the message to the received channel attributes;

selecting at least one of the available wireless channels for transmission of the message; and controlling one of the transceiver functions corresponding—to the selected wireless channel to transmit the message over its corresponding—wireless channel.

29. The device of claim 25, wherein the channel requirements further comprise bandwidth parameters.

30. The device of claim 25, wherein the sequence of operations further comprises:

receiving channel requirements by way of an application program interface command.

31. The device of claim 30, wherein the operation of receiving channel attributes comprises:

executing a corresponding application program interface command.

* * * * *

UNITED STATES PATENT AND TRADEMARK OFFICE
CERTIFICATE OF CORRECTION

PATENT NO.        : 7,400,903 B2
APPLICATION NO.   : 10/413648
DATED             : July 15, 2008
INVENTOR(S)       : Matthew B. Shoemake, Carl M. Panasik and Jie Liang Page 1 of 1

It is certified that error appears in the above-identified patent and that said Letters Patent is hereby corrected as shown below:

In column 18, in lines 27 and 28, "on" should be changed to --one--.

In column 18, in line 66, please change "selecting --one" to --selecting one--.

Signed and Sealed this

Ninth Day of September, 2008

JON W. DUDAS
*Director of the United States Patent and Trademark Office*